United States Patent

Kasslin et al.

Patent Number: 6,075,789
Date of Patent: Jun. 13, 2000

[54] SYSTEM FOR CONNECTING A PACKET DATA NETWORK TO A DIGITAL RADIO NETWORK

[75] Inventors: Mika Kasslin, Helsinki; Mika Rinne, Espoo, both of Finland; Ari Salomäki, Bochum, Germany

[73] Assignee: Nokia Telecommunications Oy, Espoo, Finland

[21] Appl. No.: 08/981,681

[22] PCT Filed: Jul. 3, 1996

[86] PCT No.: PCT/FI96/00391

§ 371 Date: Jul. 28, 1998

§ 102(e) Date: Jul. 28, 1998

[87] PCT Pub. No.: WO97/02670

PCT Pub. Date: Jan. 23, 1997

[30] Foreign Application Priority Data

Jul. 6, 1995 [FI] Finland ..................... 953336

[51] Int. Cl.[7] ............... H04L 12/28; H04L 12/56
[52] U.S. Cl. ................ 370/395; 370/401; 370/413
[58] Field of Search ............... 370/395, 279, 370/285, 290, 299, 386, 389, 392, 218, 278, 280, 294, 300, 390, 296, 397, 399, 401, 402, 409, 412, 413, 415, 417, 428, 465, 466, 467, 469, 230, 270, 326, 328, 336, 292, 400

[56] References Cited

U.S. PATENT DOCUMENTS

| | | | |
|---|---|---|---|
| 5,010,549 | 4/1991 | Katou et al. | 370/522 |
| 5,452,288 | 9/1995 | Rahuel et al. | 370/203 |
| 5,526,349 | 6/1996 | Diaz et al. | 370/392 |
| 5,757,854 | 5/1998 | Hunsinger et al. | 370/500 |
| 5,793,413 | 8/1998 | Hylton et al. | 348/12 |
| 5,875,178 | 2/1999 | Rahuel et al. | 370/392 |
| 5,912,917 | 6/1999 | Engelbrecht et al. | 1/1 |

FOREIGN PATENT DOCUMENTS

| | | |
|---|---|---|
| 493 287 | 7/1992 | European Pat. Off. |
| 565 470 | 10/1993 | European Pat. Off. |
| 95/28810 | 4/1995 | WIPO |
| 95/27942 | 10/1995 | WIPO |
| 97/02670 | 1/1997 | WIPO |

OTHER PUBLICATIONS

Kimmo Hakkarainen, A Channel Encoder/Decoder for DAB Demonstrator, MSc Thesis, 1995, Tampere University of Technology, pp. 2–13.

Assmus et al: "Ubermittlung von codierten audiosignalen niedriger bitrate in einem zukunftigen ATM–netz", Rundfunktechnische Mitteilungen, vol. 38 No. 3, 1994, p. 85–p. 91.

*Primary Examiner*—Dang Ton
*Assistant Examiner*—Phirin Sam
*Attorney, Agent, or Firm*—Pillsbury Madison & Sutro

[57] ABSTRACT

A system for adapting packets received from a digital packet network to a radio system which operates on the digital audio broadcasting (DAB) principle. The system has a transmitting end as which a data group includes a data field and a header intended for a service component, the header containing an address field intended for an end-user's address. The service component is transmitted on the transmission path in DAB packets whose header includes an address field (PKT address) identifying the service component and whose data in the data field has been obtained by dividing the data group into segments and by transferring each segment into the data field of one corresponding DAB packet. The system further includes: a receiving unit for receiving and temporarily storing desired packets, an address and protocol converter which converts the address of each temporarily stored packet, inserts at least a pan of the address convened to the address field of the data group to be formed, inserts the data of the packet as such to the data group data field and inserts at least a pack of the address convened to the address field of the DAB packets to be formed, and a storing device which stores the DAB packets formed and from which the packets can further be applied to the DAB system transmitter.

10 Claims, 7 Drawing Sheets

SYSTEM FOR CONNECTING A PACKET DATA NETWORK TO A DIGITAL RADIO NETWORK

BACKGROUND OF THE INVENTION

The present invention relates to transferring data from a packet network to a digital radio network whose transmission channel enables transmission of audio and data services and selective reception of these services.

A known packet relay mechanism is represented by Frame Relay FR. In FR transfer technique, error correction and flow control are carried out at termination points of the network and not in every link as in packet data transfer according to the X.25 standard. FR speeds up routing of packets via several connection points to their destination, because it is not necessary to check, as far as errors are concerned, every packet received before transferring them to the next connection point. Originally, FR was intended for interconnecting private data networks, such as LAN networks, and it therefore defines the interface for the high-rate data between the FR network and the computers of the user. The routing is based on a local address conveyed in the frame. The frame structure per se is specified in the recommendation CCITT I.441, and parameters related to the protocol are specified in the recommendations I.233 and Q.922. The significant matter as far as the method of transfer is concerned is that the frame length is not constant, but the transfer participants negotiate the frame length to be used prior to the transfer.

No fixed bandwidth will be allocated for the service, but specific service parameters relevant to the nature of the service will be determined. These include committed information rate CIR, committed burst size Bc and excess burst size Be.

Figure 1:
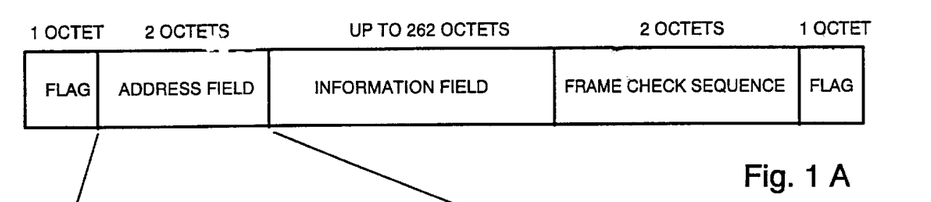
FIG. 1A illustrates the structure of an FR frame.
FIGS. 1B, 1C and 1D illustrate the contents of address fields in the FR frame.

FIG. 1A shows the structure of an FR frame. The frame comprises five fields. A frame begins and ends with a flag one octet long which is a specified bit sequence containing six successive 1 bits. For logical channel numbering, an address field is used, the contents of which will be disclosed below. An information field succeeding the address field does not have a fixed length, but contains an even number of octets of user data. The user and the FR network on the one hand, and the FR networks on the other hand, negotiate with one another the data field length to be used, whereby the frame length may be up to 4096 octets. The information field is followed by a frame check sequence FCS, two octets in length.

FIG. 1B shows the contents of an FR frame address field. The field contains address field extension bits EA, a C/R (Command/Response) identifier bit allocated for use by the end-user's equipment, forward and backward explicit congestion indicator bits FECN and BECN on the basis of which the system is able to reduce traffic rate, a discard eligibility indicator DE which means that frames containing this indicator can under specific conditions be discarded, and, essential to the present invention, a permanent virtual circuit or a data link connection identifier DLCI. The DLCI thus indicates at each nodal point of the network where a packet is to be routed. The minimum length of the address field is two octets as in FIG. 1B, but it can be prolonged to be three or four octets in length, as illustrated in FIGS. 1C and 1D. By employing two or three octets in the address field, it is possible to support a wider DLCI address space between the user and the network, or within the network.

Relating to a wideband ISDN network, an asynchronous transfer mode ATM has been developed. The ATM outlines data transfer in a packet or circuit-switched fixed network. The data are transferred in fixed-length 53-byte ATM cells, each cell having five bytes as header of the cell and the remaining 48 bytes as actual information. The ATM cells are specified in the recommendations CCITT Recommendation I.361 and CCITT Draft Recommendation I.150. In simplified terms, it can be noted that the user information to be transferred is split into segments of fixed length, and each segment is inserted in the information field of the ATM cell. The number of segments in a unit time represents the transfer capacity required by the user. In addition, a header, to be disclosed in greater detail below, will be inserted in the information field, whereby a fixed-length 53-byte ATM cell will be created. A cell is an independent data transfer unit as it contains information on the receiving party's address on the basis of which the receiving party can be located in the network.

An ATM network is flexible, fast and suitable for different kind of services particularly due to its small cell size. A service may flexibly reserve capacity according to its needs by reserving an appropriate number of cells.

Figure 2:
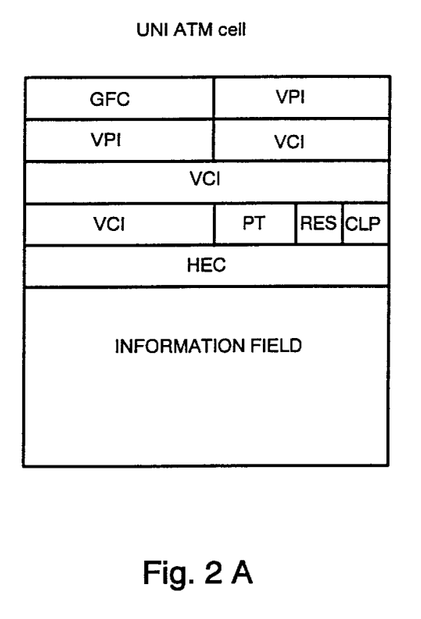
FIG. 2A illustrates a UNI ATM cell.
FIG. 2B illustrates a NNI ATM cell.

FIGS. 2A and 2B illustrate the structure of both the cell and different header fields. The header structure employed depends on what segment in the ATM network is under examination. The cell structure illustrated in FIG. 2A is only employed in a user-network interface UNI, and the header structure of FIG. 2B is employed in the rest of the ATM network, i.e. in a network-node interface NNI. In the header of the ATM cell illustrated in FIG. 2A, the field GFR (Generic Flow Control) is intended for traffic control carried out in UNI. The other fields are the same as in the header of the cell in FIG. 2B, and they are PT (Payload Type) field which distinguishes the network control cells from the subscriber's cells, an RES (Reserved) field, which is in reserve, a CLP (Cell Loss Priority) field which assigns a priority to the destruction of cells, and an HEC (Header Error Control) field which is the header checksum.

As far as the present invention is concerned, the most important part of the header is a routing field. It consists of two parts: virtual path identifier VPI, and virtual channel identifier VCI. At the user-network interface UNI, the identifier VPI consists of 8 bits, and at the network-node interface NNI this identifier consists of 12 bits. The virtual channel identifier VCI has 16 bits at both the interfaces. As its name indicates, the routing field acts as the basis for routing cells in the ATM network. The VPI is primarily used in the internal parts of the network, and in practice it often determines to which physical connection the cell is to be routed. Instead, the VCI is often used for routing purposes at the network border only, e.g. where the user's PC is coupled to the ATM network. However, it should be noted that the route for the cell is only determined by the VPI and the VCI together.

In the above, two packet networks operating at the fixed network side have been described. In the following, a brief description will be given of the new DAB (Digital Audio Broadcasting) system, developed for efficient use of radio frequency bands. In particular, DAB has been developed for transmitting audio and data services to a mobile environment, i.e. to a mobile receiver.

DAB specifies a digital radio channel based on several carriers. The transmission channel may be either a continuous data stream channel or a packet channel; however, packet transfer is more flexible and in an easier way enables the transfer of data units having a finite length. From the point of view of transmission, transfer and reception, a thorough description of the DAB system is given e.g. in "A channel Encoder/Decoder for DAB Demonstrator", MSc Thesis, 1995, Kimmo Hakkarainen, Tampere University of Technology, pp. 2–13.

Figure 3:
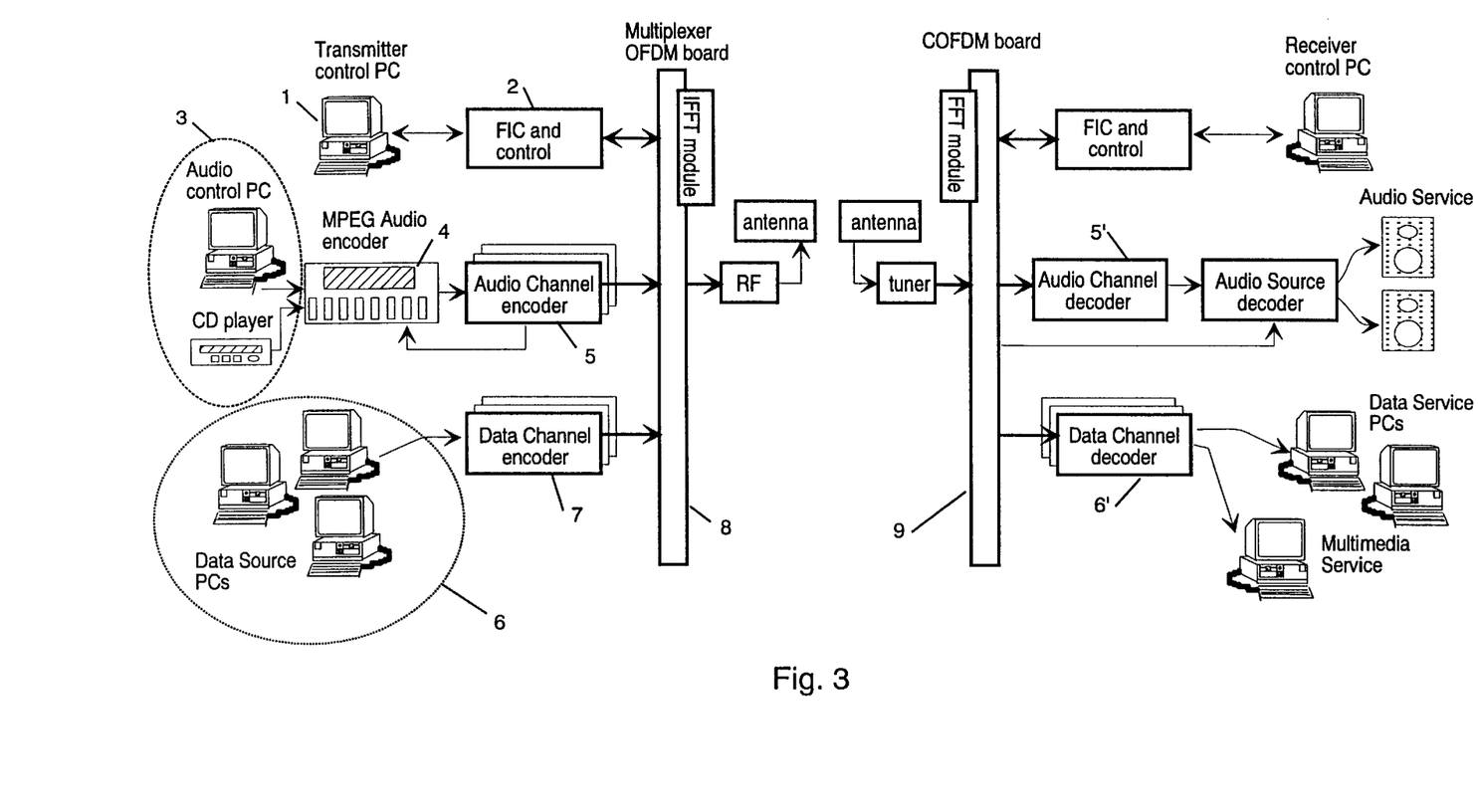
FIG. 3 illustrates a DAB system.

Reference is now made to FIG. 3, illustrating a DAB system in a simplified form. At the transmitting end, a transmission control unit 1 controls the transmission. An FIC and control block 2 generates SI (Service Information), concerning the audio and data services, MCI (Multiplex Configuration Information), and CA information (Conditional Access) which may concern the charging/encryption of the services. Together, these form a FIC (Fast Information Channel). Audio information, e.g. music, provided by audio services providers 3, is compressed in an encoder 4 and applied to audio channel encoders 5. Correspondingly, data supplied by providers of data services are coded in data channel encoders 7. The channel coded data, audio and FIC information are applied to block 8 carrying out OFDM (Orthogonal Frequency Division Multiplexing). An OFDM symbol generated by the block as a reverse fast Fourier transformation is a group of sub-carriers, and it has a precisely defined duration. Single sub-carriers are modulated by D-QPSK method (Differential Quaternary Phase Shift Keying), and eventually a DAB transmission signal will be obtained which is comprised of successive transfer frames. Therefore, each frame is time-multiplexed between the synchronization channel, fast information channel FIC, and an MSC (Main Service Channel) containing the audio and data services. At the receiving end, the signal is decoded in a COFDM (Coded Orthogonal Frequency Division Multiplex) block 9, which converts the I-Q signal into digital form, the digitized signal is converted into the frequency domain by a fast Fourier transformation, the frequency interleaving is removed, and transfer frames are made up from successive OFDM symbols. The information channel FIC and the MSC channel containing the audio and data services are separated, and sub-channels are separated from the MSC channel and they are channel decoded in decoders 5' and 6'. Desired sub-channels are then applied to further processing. On the basis of the FIC channel received, the subscriber will know the services contained in the signal received, and may accordingly select the service or services he desires.

An advantage of the DAB system is that the service providers can be allocated data capacity dynamically. The capacity may instantaneously reach 1.728 Mbit/s, maximum. In such a case, the data are transmitted in packets according to FIG. 4A, consisting of a header field, data field and checksum. The significance of the fields described is in accordance with the DAB standard. The packet header contains information of the packet length (PKT LEN) which may be 24, 48, 72 or 96 bytes, continuity index (CONT IND), first/last packet information (FIRST/LAST), address identifying the service component (PKT ADDRESS), a command (Command), and the length of the actual data field (DATA LEN). A data field (DATA FIELD) contains the actual data conveyed and, if necessary, padding bits. Finally, a packet checksum (PKT CRC) is inserted.

Figure 4:
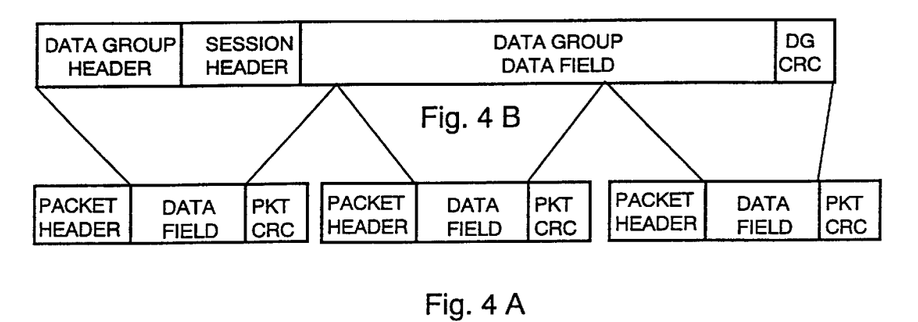
FIG. 4A illustrates a DAB packet.
FIG. 4B illustrates a Data Group.

The packets are made up of a Data Group according to FIG. 4B. The Data Group, in turn, is formed so that the data stream provided by the data service provider of e.g. FIG. 6 from an information source is divided into bytes and the bytes are used for filling the data field of the Data Group. A group header and a session header are added. As soon as the data field of the Data group is full, the entire Data group will be divided mechanically into fixed-length segments without paying attention to the information or fields. Each segment constitutes the data field segment of the data packet. When a header is added to each of the fixed-length segments obtained by dividing, the result is a data packet according to FIG. 4A, which will be transferred on the transmission path.

Usually, the Data Group consists of data fields of several packets transmitted successively. In its simplest form, one packet is enough to form a Data Group.

Figure 5:
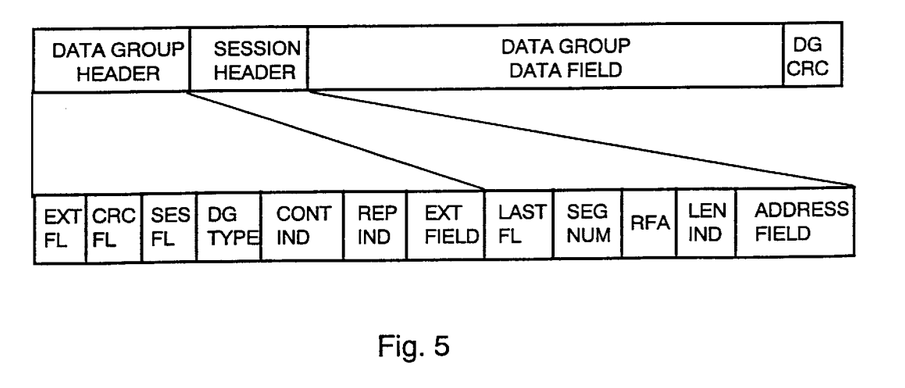
FIG. 5 illustrates fields of the Data Group headers.

The Data Group fields are illustrated in FIG. 5. The fields of the data group header are: EXT FL=Extension flag, CRC FL=CRC flag, SES FL=Session Flag, DG TYPE=Data Group type, CONT IND=Continuity index, REP IND= Repetition index, and EXT FIELD=Extension field.

The fields of the session header are LAST FL=Last, SEG NUM=Segment number, RFA=Reserved, LEN IND indicates the length of the succeeding address field and ADDR FIELD=the address of the end-user.

These header fields are followed by the actual data, and the checksum DG CRC of the Data Group. By means of the end-user's address ADDR FIELD, the packets are directed to the receiving party indicated in the reception, who is then able to utilize the service conveyed in the packets.

As indicated by FIG. 3 and the description related thereto, the idea behind the DAB system is that the units 3 and 4 of the audio and data services providers are directly connected to the transmitter in a similar manner as in present broadcasts which in most cases have the programme source in a studio or at the end of a direct link connection. On the other hand, there are presently a large number of service providers, such as those offering e.g. library services and various kinds of information services, via X.25, X.400, Internet, etc. connections. All the services can be transferred via the ATM or FR network. It would be natural for the service provider to establish his service via the ATM or FR network to be a DAB service source, whereby the service could be conveyed by means of the DAB system to a mobile receiving party and/or group of subscribers.

The above is associated with the problem that no mechanism exists by means of which a digital packet network, especially an ATM or an FR network, can be connected to the DAB system.

BRIEF DESCRIPTION OF THE INVENTION

It is consequently an object of the present invention to provide a system by means of which information conveyed from the packet network in fixed-length or variable length packets can be transferred to be information of packets according to the DAB system.

This object is achieved with a system.

Which converts the packet Data Group described in the DAB protocol to be suitable for forwarding a packet received from the fixed network so that packets from the fixed network can be received and inserted directly in the DAB protocol packet channel. From the packet stream originating in the fixed network, desired packets are separated by means of a receiving unit. An address and protocol converter is used for separating, from the packet, the packet address and for converting it into an address of a mobile DAB receiver by means of a conversion table. In the conversion, an address is generated which best covers a group of subscribers. The group of subscribers may comprise all the receivers within the coverage area, a specific group or a single receiving party. The converted address is transferred to the header field of the Data Group. The contents of the information field in the packet received are transferred as such to the data field of the Data Group. If the information field of the packet received is longer than the maximum length of the data field, a new Data Group will be formed. Then, in a known manner, DAB packets will be made up from the Data Group for transmission to the receiving party.

According to a first preferred embodiment, the digital packet network is an ATM network. This makes it possible to form, for each ATM cell received, a DAB packet which as a whole contains one Data Group. The VPI and VCI addresses of the ATM cell are utilized so that the VPI is converted and transferred to the DAB packet address field, and the VCI is transferred to the address field in the Data Group Session Header. The information field is transferred as such to the data field of the Data Group. Alternatively, the DAB packets can be made up by packing several cells of a VPI/VCI pair into one Data Group, which is then transmitted in several DAB packets. An advantage of the latter method is that the larger number of ATM cells are packed into one Data Group the less specific kind of overhead will occur in the DAB transmission. A drawback of the first method is its relatively poor "efficiency". This is due to the fact that as only one ATM cell is transmitted in each DAB packet, a rather large number of padding bits will have to be inserted in the packet.

According to second preferred embodiment, the digital packet network is an FR network. This means that the address field is separated and converted from the FR packet received. The converted address is transferred to the address field of the Data Group Session Header and to the address field of the DAB packets header.

BRIEF DESCRIPTION OF THE SEVERAL VIEWS OF THE DRAWING

In the following, the invention will be described in greater detail with reference to the accompanying drawings, in which.

DETAILED DESCRIPTION OF THE INVENTION

Figure 6:
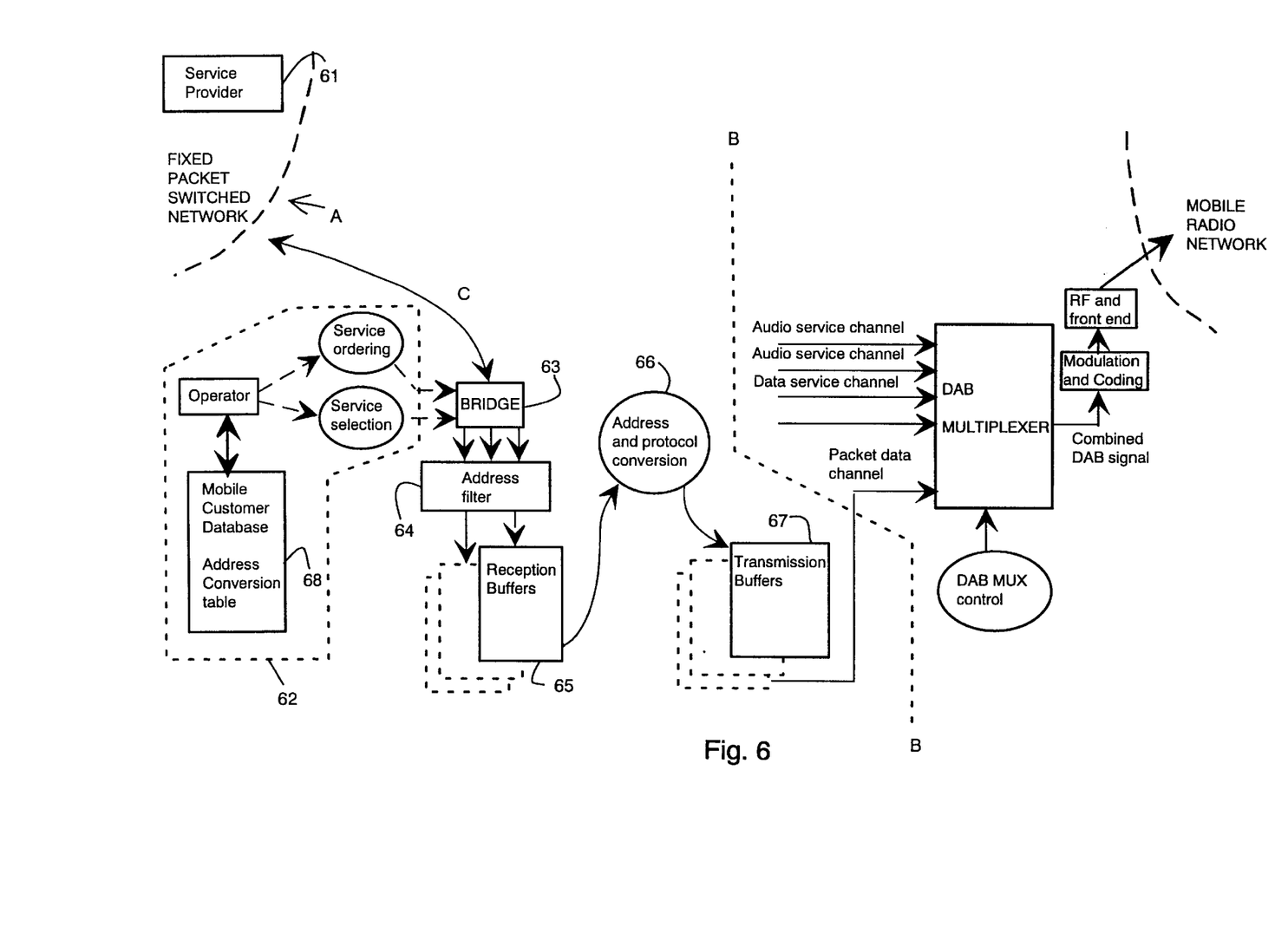
FIG. 6 illustrates the system of the invention.

FIG. 6 illustrates the system according to the invention in its operating environment. A service provider 61 provides services via a fixed, high-rate packet network, the border of the network being illustrated with a broken line A. The services are transmitted via the DAB system to mobile receivers. The DAB system is illustrated by the blocks to the right of the broken line B—B. Thus, the system of the invention is the section between the broken lines A and B.

The main parts of the system are a bridge 63, an address filter 64, buffer memories 65 and 67 constituting the receiving unit, and an address and protocol conversion block 66.

Via the bridge 63, there exists a bidirectional connection C to the packet network A. The connection is bidirectional because it is used by an operator to subscribe to a service from an operator block 62 by transmitting a service request to the network A, and the data packets of the service are received via the connection. The bridge may be a prior art printed board implementing the network interface in question, such as an ATM connection. Data packets of the services subscribed to are received via the bridge 63. On the basis of network-specific address identification of the fixed network carried out in an address filter 64, only the desired packets can be separated from the aforementioned packets. The packets of a specific service thus obtained are applied to dynamic receiver buffers 65 into which the packets are organized in a correct sequence. It is advantageous to store the packets into the buffers as a whole, in other words the addresses and the data, because managing the packets will consequently be easier. It is also possible to store in the buffers only the data per one address, or a pair of addresses in case of ATM, but that leads to a need to use a separator character between the data fields (cells). This method is not recommended because the network node may well receive simultaneously multiplexed packets with different addresses, whereby the management of packet addresses separately may become complicated.

The packets are read from the receiver buffers one packet at a time to the address and protocol conversion block 66 which separates the actual information part and the header part, containing the address, from the packet. Following this, it firstly inserts the information part to the Data Group data field, FIG. 4B, and secondly, converts the fixed network address it separated from the header part into an address of the DAB receiver. The conversion is performed by using a conversion table. The conversion table 68 is included in a database containing the DAB subscriber data. In the database, the address of the network services subscribed to by the operator, i.e the address of received packets associated with the same service, corresponds to the address of the mobile DAB unit, i.e. receiver. After completion of the conversion, the converted address is inserted in the Data group header "Session Header". When DAB packets are formed from the Data Group, the converted address will be inserted as the packet address as well.

The block 66 can also be realized as an ASIC circuit comprising an address comparator and a converter. The circuit has been programmed in a suitable address conversion mode, and it directs the data fields separated from the packets by the comparator to a Data Group generator, and the converted address fields to a Data Group Header generator. The task of the address converter is to retrieve a subscriber table from the directory of the subscriber database, and to generate a DAB address which best covers a group of subscribers which may comprise all the receivers within the coverage area, a specific group or a single receiving party.

The DAB packets formed are then applied to a storing device, with the transmitter buffers 67 operating as such a device. From them, the packets are applied as a packet data channel to a DAB multiplexer, and further for transmission to the radio path. The DAB system sees the system described above as just one service provider among many. The entire system according to the invention can be implemented by a PC computer.

According to the first embodiment, the packet network A is an ATM network, whereby ATM cells according to FIGS. 2A and 2B are received. The system in such a case converts the packet Data Group specified in the DAB protocol to be suitable for transferring an ATM cell. In this manner, the system is capable of receiving fixed network ATM cells and insert them directly in a packet channel according to the DAB protocol. Addressing of an ATM cell as the address of a mobile unit is carried out by means of the conversion table 68.

Figure 7:
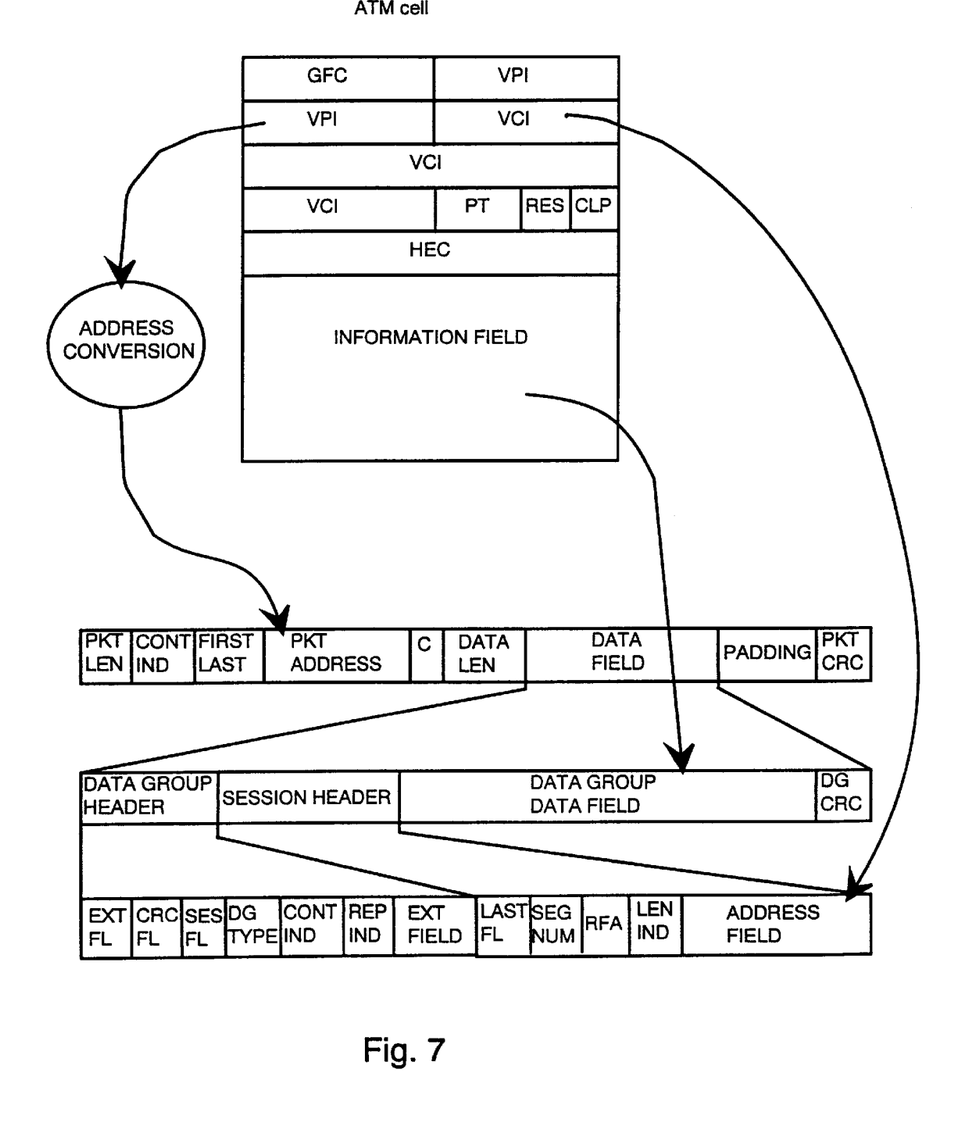
FIG. 7 illustrates converting an ATM cell into a DAB packet.

Placing the ATM cell by the system in the DAB protocol packet channel is illustrated in FIG. 7. The basic principles in the conversion carried out are to maintain the information field of the ATM cell unchanged, and simplicity of the address conversion.

In the first conversion method, for each ATM cell, a 72-byte DAB packet is generated which as a whole contains one Data Group. Accordingly, the Data Groups are either 55, 57 or 59 bytes in length, depending on the use of the Data Group Header CRC and EXT FIELD. A drawback of this method is its relatively poor "efficiency" due to the fact that a rather large number of padding bits will have to be inserted in the packet.

In the second conversion method, the DAB packets are made up by packing several cells of a VPI/VCI pair into one Data Group, which is then transmitted in several DAB packets. An advantage of this method is that the larger number of ATM cells are packed into one Data Group the less specific kind of overhead will occur in the DAB transmission.

The only field of the ATM cell that has a direct influence on the DAB fields is the VPI. If required, the system carries out an address conversion for the VPI of the received ATM cell, block ADDRESS CONVERSION in FIG. 7, and the packet address thus obtained will be written as the address of the DAB packet (PKT ADDRESS). The operation of the unit is simplest when the cell is a UNI type of ATM cell as is the case in FIG. 7. This means that the VPIs have 8 bits, i.e. the address conversion is not necessarily a prerequisite but the VPI can be copied directly to form the packet address. However, if the cell is an ATM cell of the NNI type, 12-bit VPIs have to be converted into 10-bit packet addresses e.g. by means of a conversion table.

The other fields in the ATM cell indirectly affect the DAB packet via the Data Group. The virtual channel identifier VCI is directly copied to the address field of the Data Group to form a two-byte identifier (ADDRESS FIELD) of the end-user. The actual data propagating in the ATM cell information field are handled in exactly the same manner. Its contents are copied as such to the data field of the Data Group (DATA GROUP DATA FIELD), whose length will thus be 48 bytes.

Transferring, in accordance with the first embodiment, an ATM cell to a mobile user gives a restricted prospect of providing a mobile user with unidirectional services of the ATM network. By means of a packet address and service addresses, a receiver in the system recognizes ATM cells assigned to it with the address filter 63. In the transmitter, these are converted from addresses of the fixed network to addresses of the DAB network.

According to the second embodiment, the packet network A is an FR network, whereby FR frames according to FIGS. 1A–D are received. The system in such a case converts the packet Data Group described in the DAB protocol to be suitable for transferring the fixed network variable length FR frames. The system receives data packets from the fixed network and inserts their data fields directly to the packet channel of the DAB protocol. Addressing of the fixed network data packet is converted into the address of the mobile unit by means of a conversion table. The basic principle of the conversion carried out by the system is to transfer the actual information contained in the FR data packet received forward to a mobile receiver without changes. On the other hand, the address conversions required have been kept as simple as possible.

Figure 8:
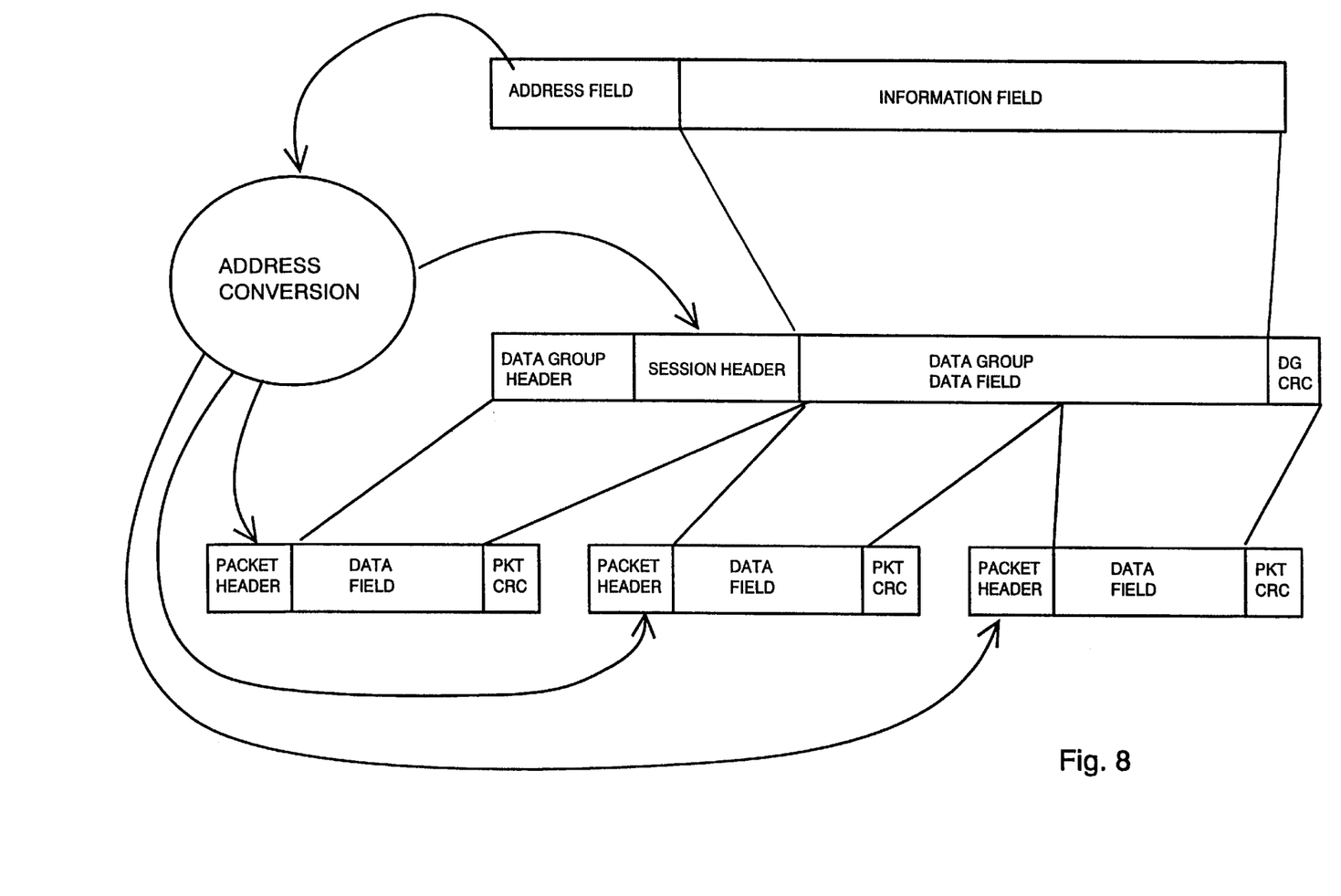
FIG. 8 illustrates converting an FR frame into a DAB packet.

The principle of converting an FR packet received from the fixed network is illustrated in FIG. 8. For each data packet, the system generates one Data Group. The size of the Data Group to be generated is determined by the size of the information field in the data packet received because the information of the packet is to be inserted in the Data Group data field. Correspondingly, one Data Group is transferred to the receiver as separate DAB packets. For the shortest FR data packets, one DAB packet is enough but usually the data packet has to be sent in several successive DAB packets.

Apart from generating the Data Group and DAB packets, also address conversion has to be carried out in the unit in the FIG. 8 block ADDRESS CONVERSION, in which the FR network addresses are converted into the packet address field PKT ADDRESS of the DAB packet, and into the address field ADDRESS FIELD of the Data Group end-user's address corresponding to the DAB transmission, FIG. 8. How the address conversion is in practice carried out, and how the Packet Address/End-user Address separation is performed can be freely chosen. In its simplest form, when FR packets of a short address field (a 10-bit DLCI) according to FIG. 1B are transferred, address conversion is not necessarily required, but the DLCIs can be directly copied as the DAB packet addresses into the fields PKT ADDRESS.

Transferring variable length packets of the fixed network to a mobile user gives a restricted prospect of providing a mobile user with unidirectional services of the fixed network. This embodiment is characterized in that the system buffers, converts and transmits variable length packets of the fixed network as DAB network packets to a mobile receiving party. The system identifies fixed network packets addressed to it by means of a packet address. In the transmitter, these are converted from addresses of the fixed network into addresses of the DAB network. An application program may utilize the packets received in the same manner as an application utilizing the fixed network, and to offer the service to its user.

The system according to the present invention can be implemented as a PC-based unit by using commercially available components and suitable ASIC circuits. The description above and the drawings related thereto are only intended to illustrate the present invention. It will be clear to a person skilled in the art that variations and modifications of the present invention may be incorporated without departing from the scope of the invention set forth in the attached claims.

What is claimed is:

1. A system for adapting packets received from a digital packet network to a radio system which operates on the digital audio broadcasting (DAB) principle and on whose transmitting end;

a data group includes a data field and a header intended for a service component, the header containing an address field intended for an end-user's address, the service component is transmitted on the transmission path in DAB packets whose header includes an address field (PKT address) identifying the service component and whose data in the data field has been obtained by dividing the data group into segments and by transferring each segment into the data field of one corresponding DAB packet, characterized in that the system comprises:

a receiving unit (63, 64, 65) for receiving and temporarily storing desired packets, an address and protocol converter (66) which converts the address of each temporarily stored packet, inserts at least a part of the address converted to the address field of the data group to be formed, inserts the data of the packet as such to the data group data field and inserts at least a part of the address converted to the address field of the DAB packets to be formed, and a storing device (67) which stores the DAB packets formed and from which the packets can further be applied to the DAB system transmitter.

2. A system as claimed in claim 1, characterized in that the packets received are asynchronous transfer mode (ATM) cells and that the address and protocol converter (66) inserts a cell virtual path identifier VPI to the address field of the DAB packet and a virtual channel identified VCI to the address field of the data group.

3. A system as claimed in claim 2, characterized in that each of the ATM cells is a user-network interface (UNI) ATM cell in which the virtual path identifier VPI consists of 8 bits, and that the address and protocol converter (66) copies the cell VPI as such to the 10-bit address field of the DAB packet.

4. A system as claimed in claim 2, characterized in that each of the ATM cells is a network mode interface (NNI) ATM cell, in which the virtual path identifier VPI consists of 12 bits, and that the address and protocol converter (66) converts the VPI to a length of 10 bits.

5. A system as claimed in claim 2, characterized in that the address and protocol converter (66) copies the cell virtual channel identifier VCI as such to the address field of the data group.

6. A system as claimed in claim 1, characterized in that the packets received are frame relay (FR) frames and that the address and protocol converter (66) converts a data link connection identifier DLCI, included in a FR frame address field, both into the end-user address to be inserted in the data group address field, and into the address to be inserted in the DAB packet address field.

7. A system as claimed in claim 6, characterized in that the address and protocol converter (66) copies the DLCI as such to the DAB packet address field if the DLCI has 10 bits.

8. A system as claimed in claim 1, characterized in that the system further comprises a subscriber database (68), and that the address and protocol converter (66) retrieves from the subscriber database information concerning those DAB receivers to whom the packets are to be forwarded, and generates the end-user's address on the basis of said information.

9. A system as claimed in claim 1, characterized in that the address and protocol converter (66) comprises an address comparator which compares each packet header to a reference header, and if the headers are equal, the converter (66) replaces the packet address with addresses according to the DAB protocol.

10. A system as claimed in claim 1, characterized in that the receiving unit comprises a bridge (63) via which the system is connected to the packet network, an address filter (64) which separates desired packets from the packets obtained from the network, and buffer memories (65) for temporarily storing the desired packets.

\* \* \* \* \*